United States Patent Office 3,007,956
Patented Nov. 7, 1961

3,007,956
PROCESS FOR SEPARATING ORGANOSILANES
Robert G. Linville, Berkley Heights, N.J., and Harry R. McEntee, Waterford, N.Y., assignors to General Electric Company, a corporation of New York
No Drawing. Filed July 1, 1960, Ser. No. 40,147
8 Claims. (Cl. 260—448.2)

The present invention relates to a process for separating certain chlorosilanes from chlorosilane mixtures in accordance with the principles of mass transfer. More particularly, the present invention relates to the separation of chlorosilanes of particular functionality from chlorosilane mixtures by conventional fractional liquid extraction procedures and extractive distillation procedures, involving the use of certain dinitrile solvents.

The problem of separating particular chlorosilanes such as difunctional chlorosilanes from silane blends containing chlorosilanes of different functionality with substantially the same boiling ranges, as normally presented for example in the separation of dimethyldichlorosilane at substantially high purity from crude silane mixtures, has long beset the organo silicon industry. Various methods of separating such silanes from silane mixtures, including both physical, such as by distillation, or chemical techniques involving the formation of crystalline complexes have been used with varying degrees of success. For example, distillation of mixtures of certain diorganodichlorosilane and organotrichlorosilane blends has been employed, but the procedure is usually long and costly and requires elaborate distillation columns often exceeding 100 theoretical plates.

A desirable physical method of separating a plurality of liquid components with close boiling ranges in the form of a one phase mixture is a liquid-liquid extraction, particularly fractional liquid extraction, since this physical method of separation is not based on differences in volatility of the components of a mixture. In its broadest aspects, fractional liquid extraction is a procedure for separating a homogeneous mixture of two or more liquid components by creating a two phase system with the aid of an auxiliary liquid. The underlying principle of separation resides in the unequal distribution of the components in the two liquid phases.

The creation of a two phase system can be accomplished by employing a single solvent in which the components of the mixture to be separated are only partially soluble. The degree of separation, or mass transfer that can be effected, will depend on the selectivity of the solvent for a particular component in the mixture over the other components. Accordingly, the extract phase will be richer in the more solvent soluble component than the raffinate phase. By repetition of the procedure of forming a two phase system with a single solvent, in accordance with the principles of fractional liquid extraction, a raffinate having the desired composition can be produced by methods such as crosscurrent extraction, by continuously drawing off the extract phase after the phases have settled, and equilibrium has been established, and continuously treating the resulting raffinate phase with more solvent. In addition to crosscurrent extraction, another form of fractional liquid extraction involving the use of a single solvent can also be accomplished by a method known as countercurrent extraction which requires the use of an extraction tower and a distillation tower. The solvent in countercurrent extraction, unlike crosscurrent extraction, is usually gravity fed, such as at the top of the extraction tower to form a solution in the form of an extract phase with the upcoming feed. The extract phase is then drawn off the bottom of the extraction tower and the mixture distilled to recover a solvent-free extract.

In addition to the use of a single solvent, a two phase system can also be created by employing two solvents in accordance with the principles of fractional liquid extraction. The extract phase in two solvent extraction, can consist of one or more components of the mixture to be separated in an extract solvent, while the raffinate phase consists of a second solvent that is immiscible with the extract solvent. The advantages of two solvent extraction over single solvent is that the mass transfer effect between the two phases can be additive, that is, the second solvent constituting the raffinate phase, can assist in the separation of the components of the mixture to be extracted by having a preferential selectivity for a different component in the mixture to be extracted than that of the extract solvent. The separation of the mixture of components in accordance with two solvent extraction is somewhat analogous to the principles employed in single solvent extraction, except that the mixture to be separated can be fed at an intermediate point, such as on an extraction tower, between the introduction of the two solvents which flow counter-currently to each other. By proper adjustment of flow rates, and with a sufficient number of stages based on calculated values of coefficients of distribution, which in turn depend on the selectivity or the "solvent power" of the solvent employed, a complete separation of the components in the mixture to be separated can be achieved.

Another procedure that has been viewed with interest by industry for separating plural component one phase mixtures having components with close boiling points, is extractive distillation. This procedure employs the principles of extraction in a distillation column, by introducing an extract solvent having a much higher boiling point than the components of the original mixture to be extracted at a point below the top of the distillation column, so that the solvent will run down the column and extract the desired component from the upcoming feed. The solution containing the extracted component is then removed at the bottom and the extracted component is then recovered by ordinary fractional distillation.

Prior to the present invention, a solvent with the proper degree of selectivity, boiling point, etc. had not been found that provided industry with an economical means of achieving a separation of dichlorosilanes from chlorosilane mixtures by means of either fractional liquid extraction, or extractive distillation, that could successfully compete with the long and costly procedure of fractional distillation.

The present invention is based on the discovery that certain dinitriles corresponding to the following formula:

(1) 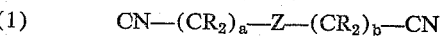

where $a$ and $b$ are whole numbers equal to from 0 to 3 inclusive, Z is a member selected from the class of

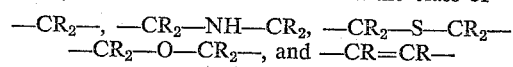

and R is a member selected from the class of hydrogen and lower alkyl, such as methyl, ethyl, etc. where R can be all the same radical or a mixture of one or more of the aforementioned radicals, are eminently suitable as extraction solvents for separating dichlorosilanes having the formula $R'_2SiCl_2$ from mixtures of said dichlorosilanes with one or more chlorosilanes corresponding to the formula:

(2) 

where R' is a member selected from the class of hydrogen, hydrocarbon radicals of less than seven carbon atoms and halogenated hydrocarbon radicals of less than seven carbon atoms and where R' can be all the same radical or a mixture of one or more of the aforementioned radicals.

Specific examples of the dinitriles illustrated by Formula 1 are dicyano-butene, β-oxydipropylnitrile, β-thiodiopropylnitrile, adiponitrile, β-iminodipropylnitrile, succinonitrile, glutaronitrile, and β-(cyanomethoxy)-propylnitrile.

Chlorosilanes that are within the formulae at (2) are trichlorosilane, methyltrichlorosilane, phenyltrichlorosilane, trimethylchlorosilane, dimethylchlorosilane, tetrachlorosilane, etc. Illustrative of the dichlorosilanes of the formula $R'_2SiCl_2$ are methyldichlorosilane, dimethyldichlorosilane, methylphenyldichlorosilane, etc.

In accordance with the present invention, there is provided a process for effecting the mass transfer of dichlorosilanes corresponding to the following formula:

$$R'_2SiCl_2$$

from a mixture of said dichlorosilanes with at least one component corresponding to the following formula:

(3)    $R'_{4-n}SiCl_n$ comprising forming a separate extract phase that is richer in said difunctional chlorosilane than said chlorosilane mixture by intimately dispersing with said chlorosilane mixture a dinitrile solvent corresponding to the following formula:

$$CN-(CR_2)_a-(Z)-(CR_2)_b-CN$$

where $a$, $b$, R and Z are as defined in Formula 1, $n$ is an integer equal to 1, 3, or 4, and R' is as defined in the formulae at (2).

The present invention is preferably practiced in accordance with two solvent fractional liquid extraction, by employing additional non-polar solvents hereinafter referred to sometimes as "wash solvent" along with the dinitrile solvents of Formula 1. Suitable wash solvents are any solvents that have low miscibility with the dinitrile solvents, and are inert to both the dinitrile solvent and the chlorosilanes during the extraction so as to avoid undesirable side reactions. Suitable wash solvents are more particularly hydrocarbon solvents including paraffin hydrocarbons such as isooctane, cycloaliphatic solvents such as cyclohexane and methylcyclohexane, and hydrogenated aromatic solvents such as decalin.

In addition to conventional two solvent extraction techniques, including both batch and continuous procedures as set forth in L. Alders, Liquid-Liquid Extraction, Elsevier Publishing Company, New York (1955), single solvent procedures are also applicable to the present invention. Also included within the scope of the present invention is extractive distillation, employing the dinitrile solvents of Formula 1 as extraction solvents.

In order to illustrate to those skilled in the art the marked selectivity that the dinitrile solvents of the present invention have for dichlorosilane over other chlorosilanes, so that separations of dichlorosilanes from chlorosilane mixtures can be accomplished economically in accordance with the principles of fractional liquid extraction or extractive distillation procedures, the following examples are given by way of illustration and not by way of limitation. All parts are by weight.

EXAMPLE 1

Twenty-five parts of adiponitrile was mixed with an equal amount of phenyltrichlorosilane and the resulting mixture was placed in a closed vessel and shaken vigorously for one hour. A separate mixture of methylphenyldichlorosilane and adiponitrile was prepared following the same procedure. The methylphenyldichlorosilane was found to be completely miscible with adiponitrile, while the phenyltrichlorosilane was found to be only partially miscible with adiponitrile as evidenced by the formation of a two phase mixture. In addition to the mixtures prepared with adiponitrile, other dinitrile solvents were mixed with phenyltrichlorosilane and methylphenyldichlorosilane, respectively, following the above procedure.

The other dinitrile solvents that were used in preparing the respective two component dinitrile-silane mixtures are shown below in Table A.

Table A shows that methylphenyldichlorosilane is more soluble in dinitrile solvents of the present invention than is phenyltrichlorosilane. The results are based on the silane content of the upper phase of each of the two phase mixtures that were produced when phenyltrichlorosilane and methylphenyldichlorosilane respectively, were separately mixed in accordance with the above procedure with the various dinitriles. With the exception of the one phase mixture of adiponitrile and methylphenyldichlorosilane, all the mixtures of the respective dinitrile solvents listed in Table A formed a two phase system with methylphenyldichlorosilane and phenyltrichlorosilane respectively. The extract phase of each of the resulting two phase systems was analyzed for silane content by mass spectrographic analysis and hydrolyzable chloride. The analysis indicated the relative solubility of methylphenyldichlorosilane as compared to phenyltrichlorosilane in the various dinitrile solvents based on the parts of the respective silanes in the extract phase of the various two phase mixtures.

Table A

| Dinitrile Solvent | Methylphenyldichlorosilane | Phenyltrichlorosilane |
|---|---|---|
| Adiponitrile | Complete miscibility | 18 |
| Oxydiproprionitrile | 11.7 | 3.2 |
| Thiodiproprionitrile | 7.2 | 2.8 |

In view of the above results, those skilled in the art would know that the dinitrile solvents in Table A are suitable extract solvents for removing dichlorosilane values from chlorosilane blends in accordance with conventional fractional liquid extraction procedures.

EXAMPLE 2

A mixture was prepared consisting of methyltrichlorosilane and dimethyldichlorosilane in the ratio of 0.087 part of methyltrichlorosilane per part of dimethyldichlosilane. This mixture was mixed with an equal weight of glutaronitrile and shaken vigorously in a closed vessel. The two phase mixture that resulted was then placed in a constant temperature bath for 140 hours at a temperature of 25° C. Samples of the two liquid phases which resulted were then analyzed by means of mass spectrographic analysis. The extract phase was poorer than the starting mixture in methyltrichlorosilane, having a ratio of 0.058 part methyltrichlorosilane per part dimethyldichlorosilane, while the raffinate phase was richer, having a ratio of 0.105 part methyltrichlorosilane per part dimethyldichlorosilane. The chlorosilanes were readily separable from the glutaronitrile by fractional distillation. On the basis of the above data those skilled in the art would know that glutaronitrile is a suitable extract solvent for removing methyltrichlorosilane as an impurity in dimethyldichlorosilane in accordance with mass transfer procedures.

EXAMPLE 3

One hundred twenty parts of a blend of phenyltrichlorosilane and methylphenyldichlorosilane in the ratio (T/D ratio) of 0.11 part of penyltrichlorosilane per part of methylphenyldichlorosilane were added to 300 parts of adiponitrile. The resulting single phase mixture was distilled under reduced pressure (17 mm.) through an unpacked Vigoureaux column 30 inches long and approximately one inch in diameter. Twenty milliliter cuts of overhead product were taken at an estimated reflux ratio of 3 parts of reflux part per 1 part of product.

Samples of the various fractions obtained were analyzed. Table B shows the T/D ratio of each of the fractions.

*Table B*

| Fraction: | T/D ratio |
|---|---|
| 1 | .163 |
| 2 | .122 |
| 3 | .090 |
| 4 | .054 |
| 5 | .033 |

Inspection of the above results shows that the composition of the fractions had shifted relative to the compositions of the starting chlorosilane mix. The first two fractions were richer than the initial starting material in phenyltrichlorosilane and the last three fractions were poorer in phenyltrichlorosilane. The above data indicates that adiponitrile shifted the vapor equilibrium of the original chlorosilane mixture sufficiently to permit the selective removal of the phenyltrichlorosilane from the silane blend containing a major proportion of methylphenyldichlorosilane. As a result, those skilled in the art would know that since a similar separation of phenyltrichlorosilane from a mixture of methylphenyldichlorosilane and phenyltrichlorosilane could not normally be accomplished with such simple distillation equipment, that adiponitrile is a suitable extract solvent for separating methylphenyldichlorosilane from phenyltrichlorosilane and methylphenyldichlorosilane mixtures in accordance with extractive distillation procedures.

EXAMPLE 4

The vapor pressures of a solution of dimethyldichlorosilane in adiponitrile and a solution of methyltrichlorosilane in adiponitrile were determined respectively at 90° C. with the aid of a mercury manometer in a closed system from which air had been removed. The solutions were prepared on a millimol basis of 149 of dimethyldichlorosilane and 137 of methyltrichlorosilane per .0092 mol of adiponitrile respectively. The ratio of the vapor pressure of methyltrichlorosilane to dimethyldichlorosilane or what will be referred to hereinafter as "$\beta$" was $$\beta = \frac{9.51}{7.66} = 1.24$$

Those skilled in the art would know that the ratio of $\beta$ above, to $\beta'$ which corresponds to the ratio of vapor pressure at 90° C. of the extrapolated values of methyltrichlorosilane to dimethyldichlorosilanes on an adiponitrile free basis, or 1480 mm. and 1400 mm. respectively, shows that adiponitrile would markedly alter the vapor equilibrium of mixtures of methyltrichlorosilane to dimethyldichlorosilane at 90° C., as follows:

$$\frac{\beta}{\beta'} \text{ at } 90° \text{ C.} = \frac{1.24}{1.06} = 1.17$$

The value of $\beta$ was also calculated for solutions of 225 millimols of trimethylchlorosilane and 272 millimols of dimethyldichlorosilane per .0092 mol of adiponitrile respectively at 80° C. following the above procedure and it was 1.19.

This value of $\beta$ was compared to the extrapolated value of the ratio of vapor pressure of trimethylchlorosilane and dimethyldichlorosilane respectively at 80° C., on an adiponitrile free basis corresponding to 1150 mm. and 1070 mm., as follows:

$$\frac{\beta}{\beta'} \text{ at } 80° \text{ C.} = \frac{1.19}{1.07} = 1.11$$

Those skilled would know that based on the above data adiponitrile would be a suitable solvent to separate dimethyldichlorosilane from mixtures of dimethyldichlorosilane and methyltrichlorosilane in accordance with the procedures of extractive distillation.

EXAMPLE 5

A number of chlorosilane blends consisting of a dichlorosilane mixed with a trichlorosilane were extracted by forming separate one phase mixtures consisting of one of the chlorosilane blends and adiponitrile, followed by "washing" the resulting adiponitrile "extract phase" with a suitable hydrocarbon solvent in accordance with a two solvent, batch type, fractional liquid extraction procedure. The trichlorosilane to dichlorosilane ratios of the various blends were measured by means of a mass spectrograph before and after a predetermined number of hydrocarbon wash stages.

In Table C, "parts" after Hydrocarbon represent the parts used in each wash stage, "Me" is methyl, "$\phi$" is phenyl, in the formulae under Silane Blend, "Original T/D" refers to the ratio of the trichlorosilane to the dichlorosilane in the starting chlorosilane blend, and "Final T/D" refers to the T/D ratio of the chlorosilane blend after the last wash stage.

*Table C*

| Silane Blends | Parts | Adiponitrile, parts | Hydrocarbon | Parts | Wash Stages | Original T/D | Final T/D |
|---|---|---|---|---|---|---|---|
| $\phi SiCl_3/Me\phi SiCl_2$ | 12.7 | 9.6 | Cyclohexane | 3.8 | 3 | .42 | No measurable $\phi SiCl_3$. |
| $HSiCl_3/MeHSiCl_2$ | 11 | 24 | do | 7.7 | 3 | .002 | No measurable $HSiCl_3$. |
| $MeSiCl_3/Me_2SiCl_2$ | 11 | 24 | Isooctane | 7 | 1 | .0129 | .0093. |
| $MeSiCl_3/Me_2SiCl_2$ | 10.6 | 24 | do | 7 | 1 | .025 | .012. |
| $HSiCl_3/MeHSiCl_2$ | 11 | 24 | do | 7 | 1 | .032 | .012. |
| $MeSiCl_3/MeHSiCl_2$ | 10.6 | 9.6 | Decalin | | 3 | .026 | .008. |

The distribution coefficient of methylphenyldichlorosilane was determined in accordance with conventional procedures, by measuring total hydrolyzable chlorine in the two phases formed by mixing an adiponitrile solution of the silane with an amount of cyclohexane equal to the adiponitrile. Hydrolyzable chlorine was determined by volumetric analysis with a standard sodium hydroxide solution. In a similar manner the distribution coefficient of phenyltrichlorosilane was determined.

The ratio of the distribution coefficient of phenyltrichlorosilane ($K^T$) to methylphenyldichlorosilane ($K^D$) referred to below as "$\alpha$," is quite favorable, and those skilled in the art would know that if a two solvent batch procedure, as illustrated by Example 5, were carried to thirty wash stages, a mixture of phenyltrichlorosilane and methylphenyldichlorosilane at an initial T/D ratio as high as 1, could be extracted to obtain methylphenyldichlorosilane at a purity of 99.8% on the basis for 100% efficiency for the system.

$$\alpha = \frac{K^T}{K^D} = \frac{.447}{.197} = 2.8$$

As a result of the present invention, there is now provided a means of separating dichlorosilanes from chlorosilane blends in accordance with conventional mass transfer procedures, in purities comparable to those achieved through the use of elaborate distillation columns of 100 theoretical plates or more. In addition the present invention provides an attractive means of separating desirable chlorosilane values from blends thereof at high purities by combining mass transfer principles in accordance with the present invention with conventional fractional distillation procedures. The need for elaborate distillation columns will thus be eliminated by substantially rectifying the silane feed in accordance with the present invention, before it is fractionated further in a conventional distillation column.

While the foregoing examples have of necessity been limited to only a few of the very many variables within the scope of the present invention, it should be understood that the present invention relates broadly to the recovery of organochlorosilane values from mixtures thereto by the employment of dinitrile solvents as illustrated in Formula 1 in accordance with conventional fractional liquid extraction and extractive distillation procedures.

What we claim as new and desire to secure by Letters Patent of the United States is:

1. A process for effecting the mass transfer of a dichlorosilane corresponding to the following formula:

$$R'_2SiCl_2$$

from a chlorosilane mixture containing said dichlorosilane and at least one member selected from the class consisting of $R'SiCl_3$, $R'_3SiCl$, and $SiCl_4$ comprising forming a separate extract phase that is richer in said dichlorosilane than said chlorosilane mixture by intimately dispersing with said chlorosilane mixture a dinitrile solvent corresponding to the following formula:

$$CN-(CR_2)_a-(Z)-(CR_2)_b-CN$$

where $a$ and $b$ are whole numbers equal to from 0 to 3 inclusive, Z is a member selected from the class consisting of $$-CR_2-, -CR_2-NH-CR_2-, -CR_2-S-CR_2-$$
$$-CR_2-O-CR_2- \text{ and } -CR=CR-$$

R is a member selected from the class consisting of hydrogen and lower alkyl, and R' is a member selected from the class consisting of hydrogen, hydrocarbon radicals of less than seven carbon atoms and halogenated hydrocarbons of less than seven carbon atoms.

2. A process in accordance with claim 1, where said chlorosilane mixture consists of said dichlorosilane and a chlorosilane corresponding to the following formula:

$$R'SiCl_3$$

where R' is a member selected from the class of hydrogen, hydrocarbon radicals of less than seven carbon atoms and halogenated hydrocarbon radicals of less than seven carbon atoms.

3. A process for effecting the mass transfer of a dichlorosilane corresponding to the following formula:

$$R'_2SiCl_2$$

from a chlorosilane mixture containing said dichlorosilane and at least one member selected from the class consisting of $R'SiCl_3$, $R'SiCl$, and $SiCl_4$, comprising forming an extract phase by intimately dispersing with said chlorosilane mixture a dinitrile solvent corresponding to the following formula:

$$CN-(CR_2)_a-(Z)-(CR_2)_b-CN$$

and intimately contacting said extract phase with a hydrocarbon solvent at low miscibility with said dinitrile solvent, where $a$ and $b$ are whole numbers equal to from 0 to 3 inclusive, Z is a member selected from the class consisting of $-CR_2-$, $-CR_2-NH-CR_2-$, $-CR_2-S-CR_2-$, $-CR_2-O-CR_2$ and $-CR=CR-$, and R is a member selected from the class consisting of hydrogen and lower alkyl, and R' is a member selected from the class consisting of hydrogen, hydrocarbon radicals of less than seven carbon atoms and halogenated hydrocarbons of less than seven carbon atoms.

4. A process in accordance with claim 3, where the said chlorosilane mixture consists of said dichlorosilane and a chlorosilane corresponding to the following formula:

$$R'SiCl_3$$

where R' is a member selected from the class of hydrogen, hydrocarbon radicals of less than seven carbon atoms and halogenated hydrocarbon radicals of less than seven carbon atoms.

5. A process in accordance with claim 4, where the said hydrocarbon solvent is a paraffin hydrocarbon.

6. In a process for separating a dichlorosilane corresponding to the following formula:

$$R'SiCl_2$$

from a starting mixture of said dichlorosilane with at least one silane selected from the class consisting of $R'SiCl_3$, $R'_3SiCl$, and $SiCl_4$ where said mixture is vaporized in a vaporization zone and a fraction of said mixture is collected in a condensation zone, the improvement in said process for separating said dichlorosilane which comprises altering the vapor equilibrium of said mixture of silane in said vaporization zone by (1) intimately and countercurrently contacting said mixture in said vaporization zone with a dinitrile solvent corresponding to the following formula:

$$CN-(CR_2)_a-(Z)-(CR_2)_b-CN$$

(2) collecting the resulting one phase mixture consisting of said dinitrile solvent and a silane extract in the form of a silane mixture that is richer in said dichlorosilane than said mixture in said vaporization zone, (3) and recovering the said silane extract from said resulting one phase mixture, where $a$ and $b$ are whole numbers equal to from 0 to 3 inclusive, Z is a member selected from the class consisting of $-CR_2-$, $-CR_2-NH-CR_2-$, $-CR_2-S-CR_2$, $-CR_2-O-CR_2-$ and $-CR=CR-$, R is a member selected from the class consisting of hydrogen and lower alkyl, and R' is a member selected from the class consisting of hydrogen, hydrocarbon radicals of less than seven carbon atoms and halogenated hydrocarbons of less than seven carbon atoms.

7. A process in accordance with claim 6, where said starting mixture consists of said dichlorosilane and a silane corresponding to the following formula:

$$R'SiCl_3$$

where R' is as defined in claim 6.

8. A process for effecting the mass transfer of dimethyldichlorosilane from a chlorosilane mixture containing dimehtyldichlorosilane and methyltrichlorosilane, comprising forming an extract phase by intimately dispersing said chlorosilane mixture with adiponitrile and intimately contacting said extract phase with cyclohexane.

References Cited in the file of this patent

UNITED STATES PATENTS 2,945,873     Shaffer et al. _____ July 19, 1960

UNITED STATES PATENT OFFICE
CERTIFICATION OF CORRECTION

Patent No. 3,007,956            November 7, 1961

Robert G. Linville et al.

It is hereby certified that error appears in the above numbered patent requiring correction and that the said Letters Patent should read as corrected below.

Column 7, line 57 for "R'SiCl" read -- R'$_3$SiCl --; line 65, for "at" read -- of --; column 8, line 30, for "silane" read -- silanes --; line 58, for "dimehtyldichlorosilane" read -- dimethyldichlorosilane --.

Signed and sealed this 24th day of April 1962.

(SEAL)
Attest:

ESTON G. JOHNSON
Attesting Officer

DAVID L. LADD
Commissioner of Patents